US007328862B2

(12) United States Patent
Takebe et al.

(10) Patent No.: US 7,328,862 B2
(45) Date of Patent: Feb. 12, 2008

(54) METHOD AND DEVICE FOR ELECTROSTATIC COATING

(75) Inventors: Masashi Takebe, Utsunomiya (JP); Toshiyuki Kokubo, Utsunomiya (JP); Takayuki Ueki, Utsunomiya (JP); Masaaki Shoji, Tochigi-ken (JP); Yoshiyuki Kumano, Iruma (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 10/549,192

(22) PCT Filed: Mar. 18, 2004

(86) PCT No.: PCT/JP2004/003652

§ 371 (c)(1), (2), (4) Date: Sep. 16, 2005

(87) PCT Pub. No.: WO2004/082847

PCT Pub. Date: Sep. 30, 2004

(65) Prior Publication Data

US 2006/0177592 A1 Aug. 10, 2006

(30) Foreign Application Priority Data

Mar. 18, 2003 (JP) ............................ 2003-074448
Mar. 18, 2003 (JP) ............................ 2003-074453
Mar. 18, 2003 (JP) ............................ 2003-074454

(51) Int. Cl.
*B05B 5/00* (2006.01)
*B05B 17/00* (2006.01)
*A01G 23/10* (2006.01)

(52) U.S. Cl. .................. 239/690; 239/690.1; 239/693; 239/1; 239/3

(58) Field of Classification Search ............... 239/690, 239/690.1, 693, 704, 124, 127, 1, 3; 118/627, 118/629; 427/475, 479, 480
See application file for complete search history.

(56) References Cited

U.S. PATENT DOCUMENTS 5,288,029 A * 2/1994 Ishibashi et al. ............ 239/691
5,399,198 A * 3/1995 Ghaisas ...................... 118/629
5,591,412 A * 1/1997 Jones et al. ................. 422/171
5,826,805 A * 10/1998 Ito et al. ..................... 239/691
6,849,129 B2 * 2/2005 Bilz et al. ................... 118/629

FOREIGN PATENT DOCUMENTS

JP 04-078460 A 3/1992
JP 4-87755 7/1992
JP 05-329407 A 12/1993
JP 06-060452 A 3/1994
JP 09-094490 A 4/1997
JP 11-319643 A 11/1999

* cited by examiner

*Primary Examiner*—Davis Hwu
(74) *Attorney, Agent, or Firm*—Arent Fox, LLP.

(57) ABSTRACT

An intermediate storage vessel has a cylinder container, a piston provided in the cylinder container so as to be slidable in a reciprocating manner, and an inpour hole portion is provided above the discharge hole portion. An insulation cover is provided so as to cover the intermediate storage vessel and an insulation mechanism, and the cover is removable from the insulation mechanism side.

3 Claims, 12 Drawing Sheets

10

10

10

METHOD AND DEVICE FOR ELECTROSTATIC COATING

CROSS-REFERENCE TO RELATED APPLICATION

This application is a National Stage entry of International Application No. PCT/JP2004/003652, filed Mar. 18, 2004. The disclosure of the prior application is hereby incorporated herein in its entirety by reference.

TECHNICAL FIELD

The present invention relates to a method of and an apparatus for applying an electrostatic coating by supplying a coating material from a supply source temporarily to a coating material reservoir, thereafter electrically isolating the supply source and the coating material reservoir from each other, and supplying the coating material to a coating gun for applying the coating material.

BACKGROUND ART

Voltage blocking, for example, is known as a process for applying a high voltage to an electrically conductive coating material to apply an electrostatic coating to a workpiece such as an automobile body or the like. According to this process, the electrically conductive coating material is temporarily introduced into an intermediate storage reservoir (intermediate storage mechanism) which is insulated from the ground potential, and thereafter a supply passage interconnecting the intermediate storage reservoir and a coating material supply source is washed and dried to form a voltage block. Then, the electrically conductive coating material to which a high voltage is applied is supplied from the intermediate storage reservoir to a coating gun, which applies an electrostatic coating to the workpiece.

One electrostatic coating apparatus for use in the above coating process is known from Japanese Laid-Open Patent Publication No. 6-60452, for example. According to Japanese Laid-Open Patent Publication No. 6-60452, as shown in FIG. 11, a pump 1 is provided as an intermediate storage mechanism, and has a coating material inlet port 1*a* supplied with an electrically conductive coating material from a coating material supply passage 2. The pump 1 delivers under pressure a predetermined amount of electrically conductive coating material from a coating material outlet port 1*b* to a coating machine 3.

The pump 1 has a piston 4 movable back and forth by high-pressure air that is supplied from an air supply source 5 through a pressure regulating valve 6. A piston rod 4*a* coupled to the piston 4 moves at a speed that is detected by a non-contact sensor 7. Based on the moving speed of the piston rod 4*a*, the flow rate of the electrically conductive coating material supplied to the coating machine 3 is measured.

The measured flow rate of the electrically conductive coating material and a flow rate that is preset dependent on the amount of coating material ejected from the coating machine 3 are compared with each other, and the pressure of the high-pressure air supplied to the pump 1 is variably adjusted by the pressure regulating valve 6 depending on the difference between the compared flow rates. The pump 1 can be reduced in size, and the amount of electrically conductive coating material that is stored in the pump 1 can be made constant.

For supplying the electrically conductive coating material supplied to the pump 1 to the coating machine 3 for the coating process, a process for filling the pump 1 with the coating material is performed, and air tends to be mixed with the coating material when the pump 1 is filled with the coating material. At this time, air which is mixed with the coating material and introduced into the pump 1 is liable to move upwardly in the pump 1.

On the pump 1, the coating material outlet port 1*b* is positioned upwardly of the coating material inlet port 1*a*. Therefore, as shown in FIG. 12, when the piston 4 moves forward (in the direction indicated by the arrow X) to supply the coating material from the pump 1 to the coating machine 3, air trapped in an upper portion of the pump 1 is delivered from the coating material outlet port 1*b* to the coating machine 3. Therefore, the coating material ejected from the coating machine 3 to the workpiece contains air mixed therewith and fails to form an appropriate coating pattern, so that a highly accurate electrostatic coating process cannot be performed.

For changing coating material colors to use a new coating material having a different color, the interior of the pump 1 is washed. At this time, a washing liquid introduced from the coating material inlet port 1*a* into the pump 1 is discharged from the coating material outlet port 1*b*. However, since the coating material outlet port 1*b* is positioned upwardly of the coating material inlet port 1*a*, the washing liquid tends to remain trapped in the pump 1, and the new coating material that is introduced into the pump 1 after it has been washed is mixed with the remaining washing liquid. Consequently, the amount of coating material to be discarded is increased, making the electrostatic coating apparatus uneconomical, and there is a danger of performing an electrostatic coating process using the coating material mixed with the washing liquid.

According to Japanese Laid-Open Patent Publication No. 6-60452, furthermore, the electrostatic coating apparatus is often mounted on a robot for automatically performing the electrostatic coating process. It is desirable that the electrostatic coating apparatus as a whole be made compact and mounted on a robot. It is thus necessary that an insulating mechanism 3 be disposed closely to the pump 1.

To prevent the electrically conductive coating material from leaking, the pump 1 is made of an insulative resin material. However, because a high-voltage generating means is incorporated for applying a high voltage to the electrically conductive coating material, the high voltage tends to leak along the surface of the pump 1 to the insulating mechanism 3, causing a dielectric breakdown.

Heretofore, the pump 1 and the insulating mechanism 3 need to be spaced a relatively large distance from each other, with the result that the electrostatic coating apparatus cannot be made compact as a whole.

With the electrostatic coating apparatus of the above type, as shown in FIG. 11, an insulating section 8 is provided between the pump 1 and a coating material supply 2*a*. The insulating section 8 has valve mechanisms 8*a*, 8*b* and an insulating pipe 2*b* connected between the valve mechanisms 8*a*, 8*b* and serving as the supply passage 2. A damping path D1 can be connected to the valve mechanism 8*a*, and the coating material supply 2*a*, a washing unit 9, and damping path D2 can selectively be connected to the valve mechanism 8*b*.

For applying an electrically conductive coating material of the same color with the above electrostatic coating apparatus, the coating material supply 2*a* is connected to the supply passage 2 through the valve mechanisms 8*a*, 8*b*, and fills the pump 1 with the electrically conductive coating material through the supply passage 2. Then, the valve mechanism 8*a* is actuated to connect the insulating pipe 2*b* to the damping path D1, and the valve mechanism 8*b* is actuated to connect the washing unit 9 to the insulating pipe 2*b*.

The washing unit 9 supplies a washing liquid to wash the insulating pipe 2*b* between the valve mechanisms 8*a*, 8*b*. Thereafter, the washing unit 9 supplies drying air. The interior of the insulating pipe 2*b* is now washed and dried, electrically insulating the coating material supply 2*a* and the pump 1 from each other. The pump 1 is now actuated to supply the electrically conductive coating material from the pump 1 to the coating machine 3, and a high voltage is applied to the electrically conductive coating material to apply an electrostatic coating to the workpiece (not shown).

As described above, each time the pump 1 is actuated to deliver the electrically conductive coating material under pressure to the coating machine 3 to apply an electrostatic coating, the interior of the insulating pipe 2*b* is washed in the insulating section 8. At this time, the electrically conductive coating material which remains in the insulating pipe 2*b* is drained from the insulating pipe 2*b* into the damping path D1 each time the insulating pipe 2*b* is washed.

Accordingly, the electrically conductive coating material which is unused in the insulating pipe 2*b* is unnecessarily drained in each washing process, resulting in an increase in the used amount of electrically conductive coating material. Particularly, if the electrostatic coating process is carried out for a long period of time, then the amount of electrically conductive coating material that is drained from the insulating pipe 2*b* is considerably increased, making the electrostatic coating apparatus highly uneconomical.

DISCLOSURE OF THE INVENTION

The present invention has been made to solve the above problems. It is an object of the present invention to provide a method of and an apparatus for applying an electrostatic coating while reliably preventing air and a washing liquid from being mixed with a coating material that is supplied from an intermediate storage mechanism to a coating gun, with simple process and arrangement, for thereby performing an electrostatic coating process with high quality.

Another object of the present invention is to provide a method of and an apparatus for applying an electrostatic coating while reducing an electrically conductive coating material that is drained in a washing process, as much as possible to perform an economical and efficient electrostatic coating process, and preventing a high voltage from leaking by providing a desired surface distance with a simple arrangement, so that the apparatus can be made compact as a whole.

In a method of applying an electrostatic coating and an electrostatic coating apparatus according to the present invention, after a coating material is supplied from a coating material supply source through an inlet hole into an intermediate storage mechanism, an insulative unit for electrically insulating the coating material supply source and the intermediate storage mechanism from each other is washed, and the coating material in the intermediate storage mechanism is supplied through an outlet hole to a coating gun to apply an electrostatic coating.

At least when the insulative unit is washed (washing step) or when the electrically conductive coating material is supplied to the coating gun (applying step), the inlet hole is disposed upwardly of the outlet hole. In the washing step, since a washing liquid is supplied into the intermediate storage mechanism, the washing liquid tends to remain in a lower portion of the intermediate storage mechanism. Since the outlet hole of the intermediate storage mechanism is disposed downwardly of the inlet hole, the washing liquid that remains in the lower portion of the intermediate storage mechanism is reliably discharged through the outlet hole. Therefore, a new coating material that is supplied into the intermediate storage mechanism is not mixed with the washing liquid. The coating material that is discarded is effectively reduced, and a high-quality electrostatic coating process is easily performed.

When the coating material is supplied from the supply source through the inlet hole into the intermediate storage mechanism, if air is introduced into the intermediate storage mechanism, then the air tends to be trapped in an upper portion of the intermediate storage mechanism. In the applying step, the outlet hole of the intermediate storage mechanism is disposed downwardly of the inlet hole.

Consequently, when the coating material in the intermediate storage mechanism is supplied to the coating gun through the outlet hole, the air that is trapped in the upper portion of the intermediate storage mechanism is not introduced from the outlet hole into the coating gun. Accordingly, air is reliably prevented from being mixed with the coating material that is supplied from the intermediate storage mechanism to the coating gun, with simple process and arrangement, making it possible to easily perform a high-quality electrostatic coating process.

A cylinder container is mounted on a movable member of the electrostatic coating apparatus, and the inlet hole is disposed upwardly of the outlet hole when the movable member is in a substantially horizontal attitude. Therefore, when the coating process is performed while the movable member is kept in the substantially horizontal attitude, for example, the outlet hole of the intermediate storage mechanism is disposed downwardly of the inlet hole at all times. Accordingly, the coating material which is mixed with air is prevented from being supplied to the coating gun as much as possible.

According to the present invention, furthermore, when a predetermined amount of electrically conductive coating material has been supplied from a coating material supply through a supply passage to a reservoir, the electrically conductive coating material stops being supplied from the coating material supply, and the electrically conductive coating material which remains in at least the insulative unit is supplied to the reservoir. That is, air which replaces the electrically conductive coating material is present in the insulative unit. Then, the insulative unit is washed, and the coating material supply and the reservoir are electrically insulated from each other, whereupon the electrically conductive coating material in the reservoir is supplied to the coating gun to apply an electrostatic coating.

Since the electrically conductive coating material which remains in insulative unit is supplied temporarily to the reservoir, when the insulative unit is washed, the electrically conductive coating material does not remain in the insulative unit. Therefore, when the insulative unit is washed, the electrically conductive coating material which is unused is prevented from being unnecessarily drained as much as possible. Consequently, an economical and efficient electrostatic coating process can be performed.

When the electrically conductive coating material of the same color is to be used, the electrically conductive coating material in the reservoir is supplied to the coating gun to apply an electrostatic coating, and thereafter the electrically conductive coating material which remains in the reservoir is returned temporarily to the insulative unit. Therefore, when the reservoir is filled with the electrically conductive coating material, air is effectively prevented with being mixed with the electrically conductive coating material, so that a failure to form a coating pattern is avoided by the simple process.

BEST MODE FOR CARRYING OUT THE INVENTION

Figure 1:
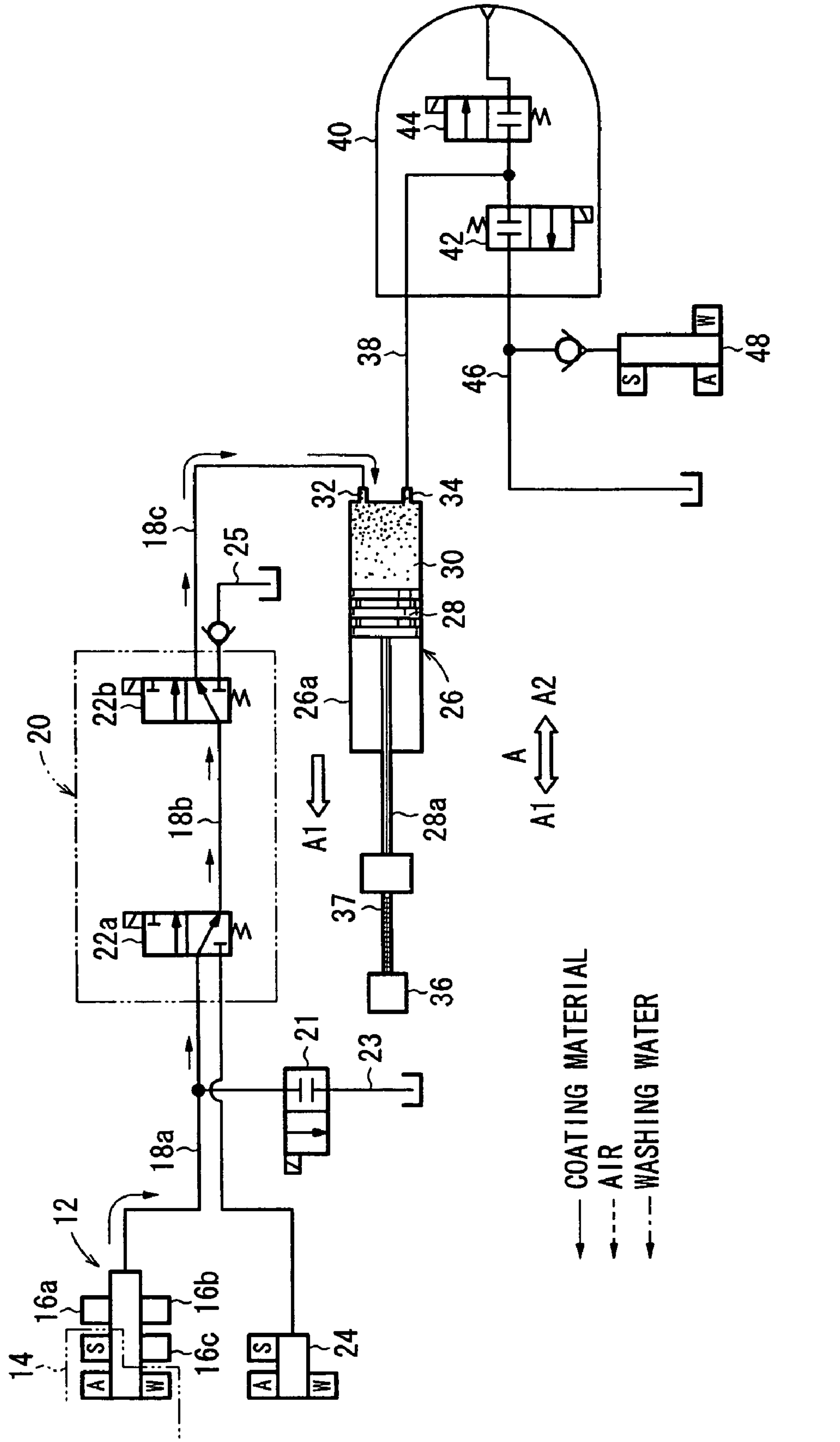
FIG. 1 is a schematic view of an electrostatic coating apparatus for carrying out an electrostatic coating method according to the present invention.

FIG. 1 is a schematic view of an electrostatic coating apparatus 10 for carrying out an electrostatic coating method according to the present invention.

The electrostatic coating apparatus 10 includes a grounded color changer valve mechanism 12 having a first washing valve 14 for controlling the supply of drying air (A), water (W), washing liquid (S), etc., and a plurality of coating material valves 16*a*, 16*b*, 16*c* which are capable of supplying electrically conductive coating materials having different colors. A block valve mechanism 20 is connected to the color changer valve mechanism 12 through a supply passage 18*a*, and a first drain passage 23 is connected to the supply passage 18*a* through a first damping valve 21.

The block valve mechanism 20 has an electrically insulated pipe (supply passage) 18*b* made of resin and a pair of directional control valves 22*a*, 22*b* connected to the respective opposite ends of the electrically insulated pipe 18*b*. The directional control valve 22*a* on the inlet side selects one at a time of the color changer valve mechanism 12 and a second washing valve 24 for controlling the supply of drying air (A), water (W), washing liquid (S), etc. The directional control valve 22*b* on the outlet side selects one at a time of a second drain passage 25 and an intermediate storage reservoir (intermediate storage mechanism) 26 through a supply passage 18*c*.

The intermediate storage reservoir 26 has a cylinder container 26*a* made of electrically insulative resin. The cylinder container 26*a* houses a piston 28 therein, which defines in the cylinder container 26*a* a cylinder chamber 30 for selectively supplying an electrically conductive coating material and a washing liquid. The intermediate storage reservoir 26 has an inlet hole 32 and an outlet hole 34 which communicate with the cylinder chamber 30, the inlet hole 32 being disposed upwardly of the outlet hole 34. A rod 28*a* made of electrically insulative resin extends from the piston 28, and is connected to a servomotor 36 through a ball screw means 37 for moving the piston 28 back and forth in the directions indicated by the arrow A.

A coating gun 40 is connected to the cylinder chamber 30 of the intermediate storage reservoir 26 through a delivery passage 38. The coating gun 40 has a second damping valve 42 and a trigger valve 44, and is connected to a high-voltage applying means (not shown). The second damping valve 42 is connected to a third drain passage 46 for draining a waste liquid including the electrically conductive coating material and the washing liquid, which is produced in a washing process, out of the delivery passage 38.

To the third drain passage 46, there is connected a third washing valve 48 for controlling the supply of drying air (A), water (W), washing liquid (S), etc.

Figure 2:
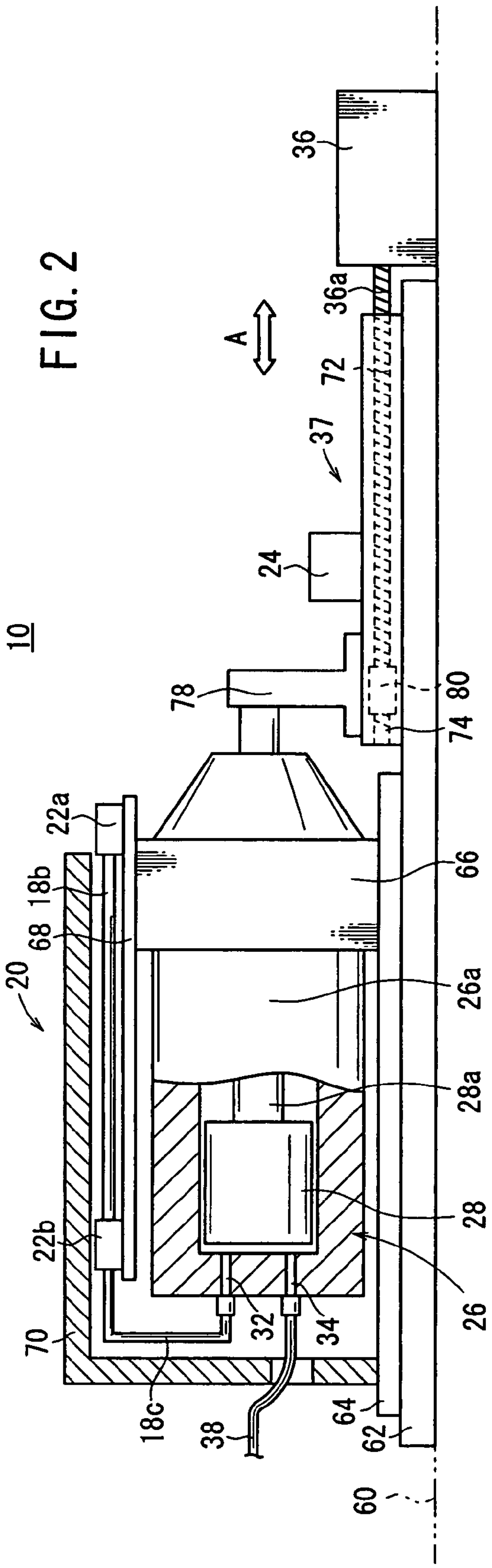
FIG. 2 is a side elevational view of an intermediate storage reservoir mounted on a robot arm of the electrostatic coating apparatus.
Figure 3:
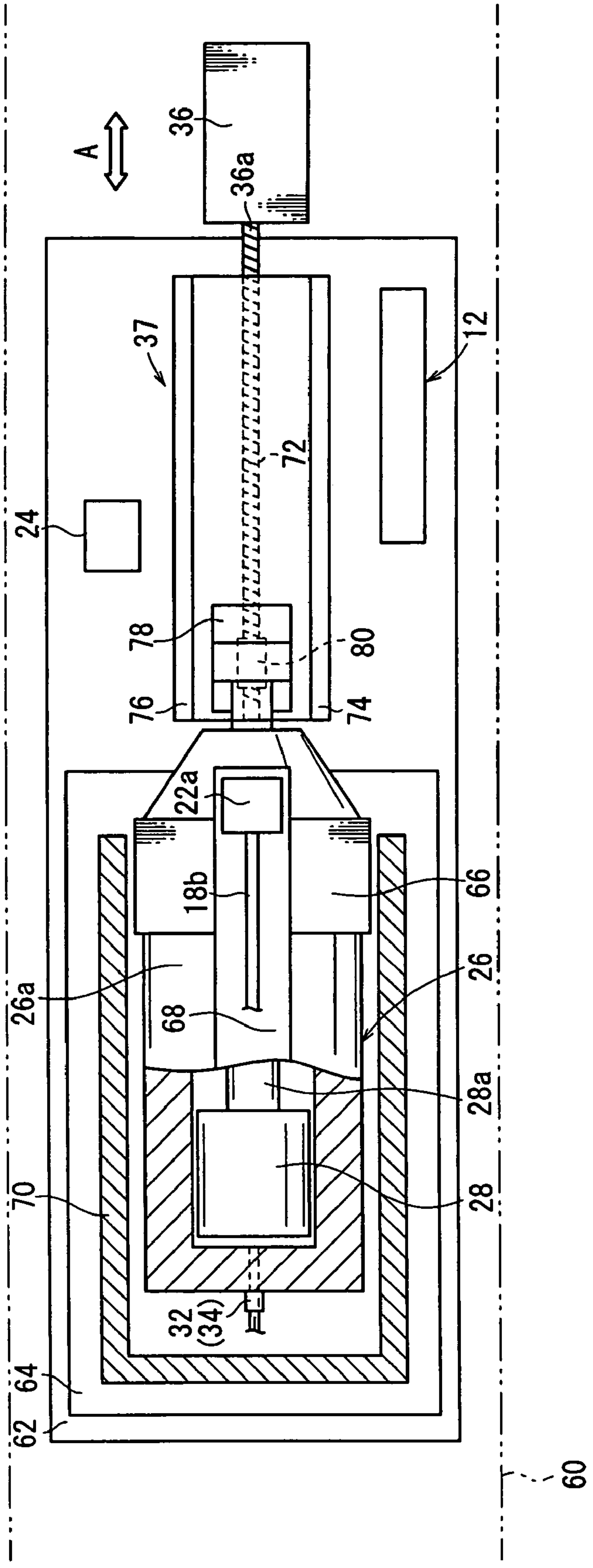
FIG. 3 is a plan view of the intermediate storage reservoir mounted on the robot arm shown in FIG. 2.

As shown in FIGS. 2 and 3, the electrostatic coating apparatus 10 has a movable component, e.g., a robot arm 60, to which a mount plate 62 is fixed. An insulative bed 64 is fixedly mounted on the mount plate 62, and an insulative support base 66 is fastened to the bed 64 by screws, for example. The cylinder container 26*a* of the intermediate storage reservoir 26 is supported in a horizontal attitude by the support base 66.

An insulative plate 68 is secured to an upper surface of the support base 66. The directional control valves 22*a*, 22*b* are mounted on an upper surface of the insulative plate 68 which is remote from the intermediate storage reservoir 26. An insulative cover 70 is removably fastened by screws to the bed 64 in covering relation to the intermediate storage reservoir 26.

Figure 4:
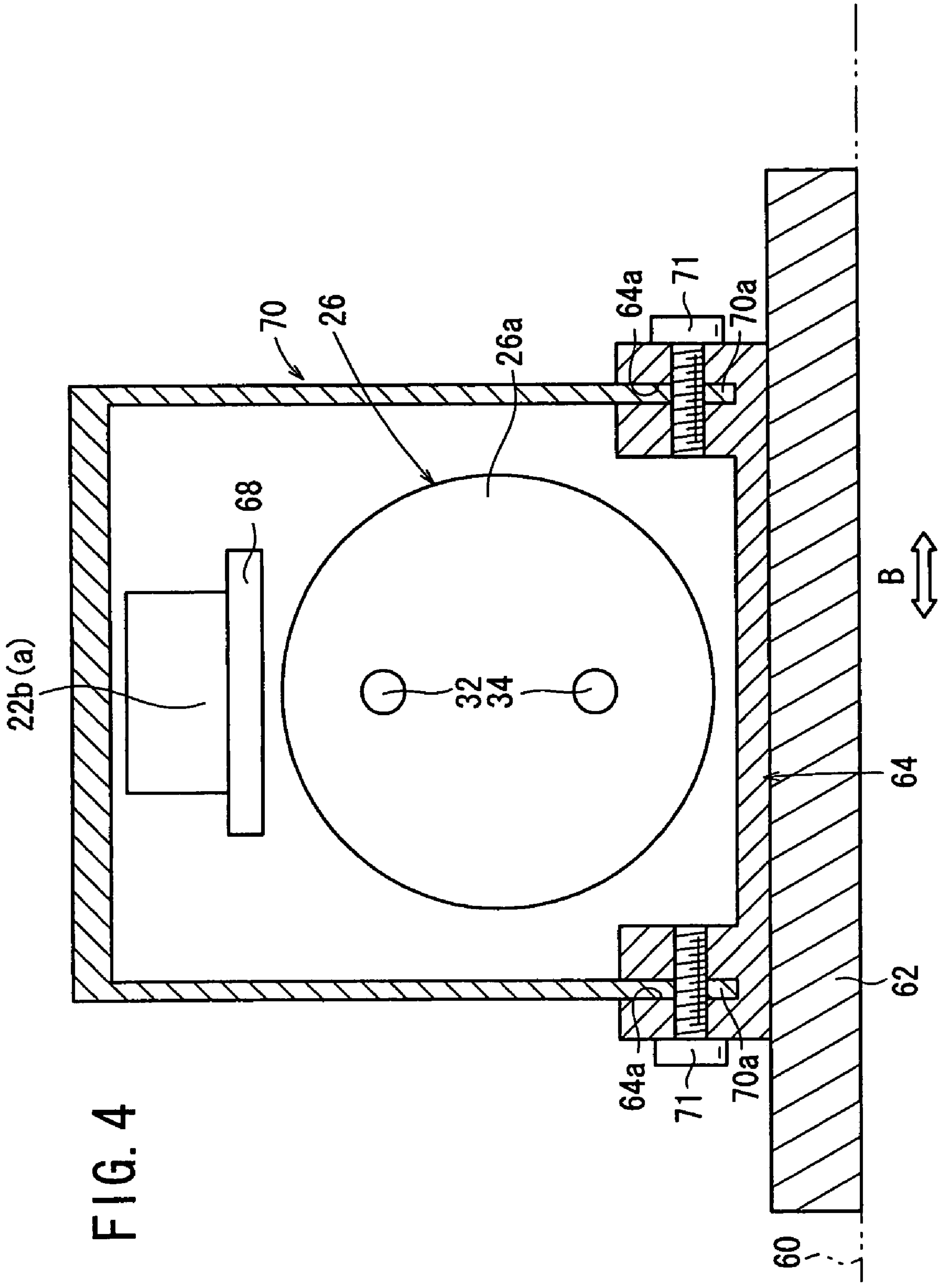
FIG. 4 is a sectional front elevational view of the intermediate storage reservoir mounted on the robot arm shown in FIG. 2.

As shown in FIG. 4, the bed 64 has slots 64*a* defined therein on diametrically opposite sides of the cylinder container 26*a* (along the direction indicated by the arrow B). The slots 64*a* extend in the axial direction of the cylinder container 26*a* (the direction indicated by the arrow A in FIG. 3). The insulative cover 70 has a channel-shaped cross section having thin downwardly extending opposite ends 70*a*, which are inserted in the respective slots 64*a* and fixed to the bed 64 by bolts 71.

The color changer valve mechanism 12, the second washing valve 24, and the servomotor 36 are mounted on the mount plate 62. The servomotor 36 has a rotational shaft 36*a* coaxially coupled to a ball screw 72 of the ball screw means

37. The ball screw 72 extends in the direction indicated by the arrow A and is rotatably supported by a frame member 74.

The frame member 74 has a linear guide 76 positioned on both sides of the ball screw 72, and a movable base 78 is disposed on the linear guide 76 for back-and-forth movement thereon. The movable base 78 has a nut through which the ball screw 72 is threaded. The rod 28*a* has a rear end fixed to the movable base 78.

When a coating process is performed, the robot arm 60 is maintained in a substantially horizontal attitude. In the substantially horizontal attitude, the outlet hole 34 of the intermediate storage reservoir 26 is disposed below the inlet hole 32 at all times.

Figure 5:
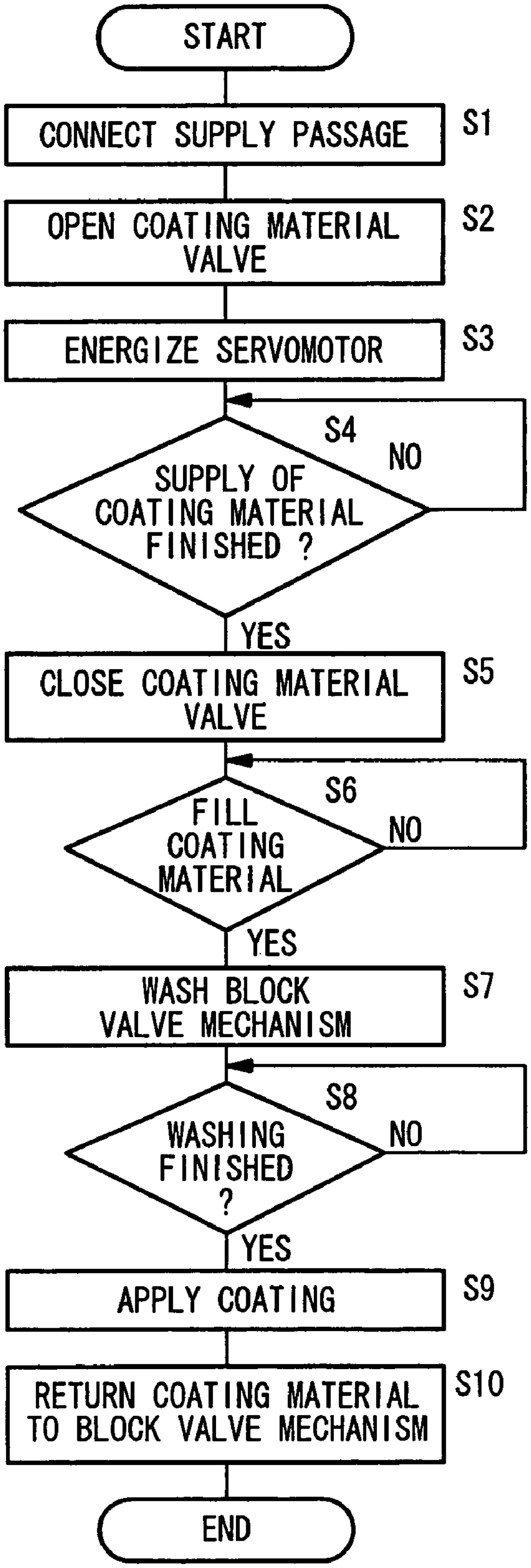
FIG. 5 is a flowchart of the electrostatic coating method.

Operation of the electrostatic coating apparatus 10 thus constructed will be described in connection with the electrostatic coating method according to the present invention, with reference to a flowchart shown in FIG. 5.

First, the supply passage 18*a*, the electrically insulated pipe 18*b*, and the supply passage 18*c* are connected to each other by the directional control valves 22*a*, 22*b* of the block valve mechanism 20 (step S1). The coating material valve 16*a*, for example, of the color changer valve mechanism 12 is opened (step S2), and the servomotor 36 of the intermediate storage reservoir 26 is energized (step S3).

As shown in FIG. 1, an electrically conductive coating material having a certain color is supplied under pressure from the coating material valve 16*a*. The electrically conductive coating material flows through the supply passage 18*a*, the electrically insulated pipe 18*b*, and the supply passage 18*c*, and fills the cylinder chamber 30 of the intermediate storage reservoir 26, and is then supplied via the delivery passage 38 to the coating gun 40 (step S4). When the electrically conductive coating material is thus supplied, the trigger valve 44 is closed and the second damping valve 42 is closed.

When the supplying of the electrically conductive coating material is finished (YES in step S4), the cylinder chamber 30 of the intermediate storage reservoir 26 has been supplied with an amount of electrically conductive coating material which is smaller by the amount of electrically conductive coating material that remains in at least the electrically insulated pipe 18*b*.

Control then goes to step S5 in which the coating material valve 16*a* is closed and the servomotor 36 is continuously energized. At this time, the first damping valve 21 is actuated to connect the supply passage 18 to the first drain passage 23 (see FIG. 6). As the piston 28 moves in the direction indicated by the arrow A1, the electrically conductive coating material that remains in the supply passage 18*c* is drawn into the cylinder chamber 30, introducing air to replace the electrically conductive coating material into at least the electrically insulated pipe 18*b*.

Figure 7:
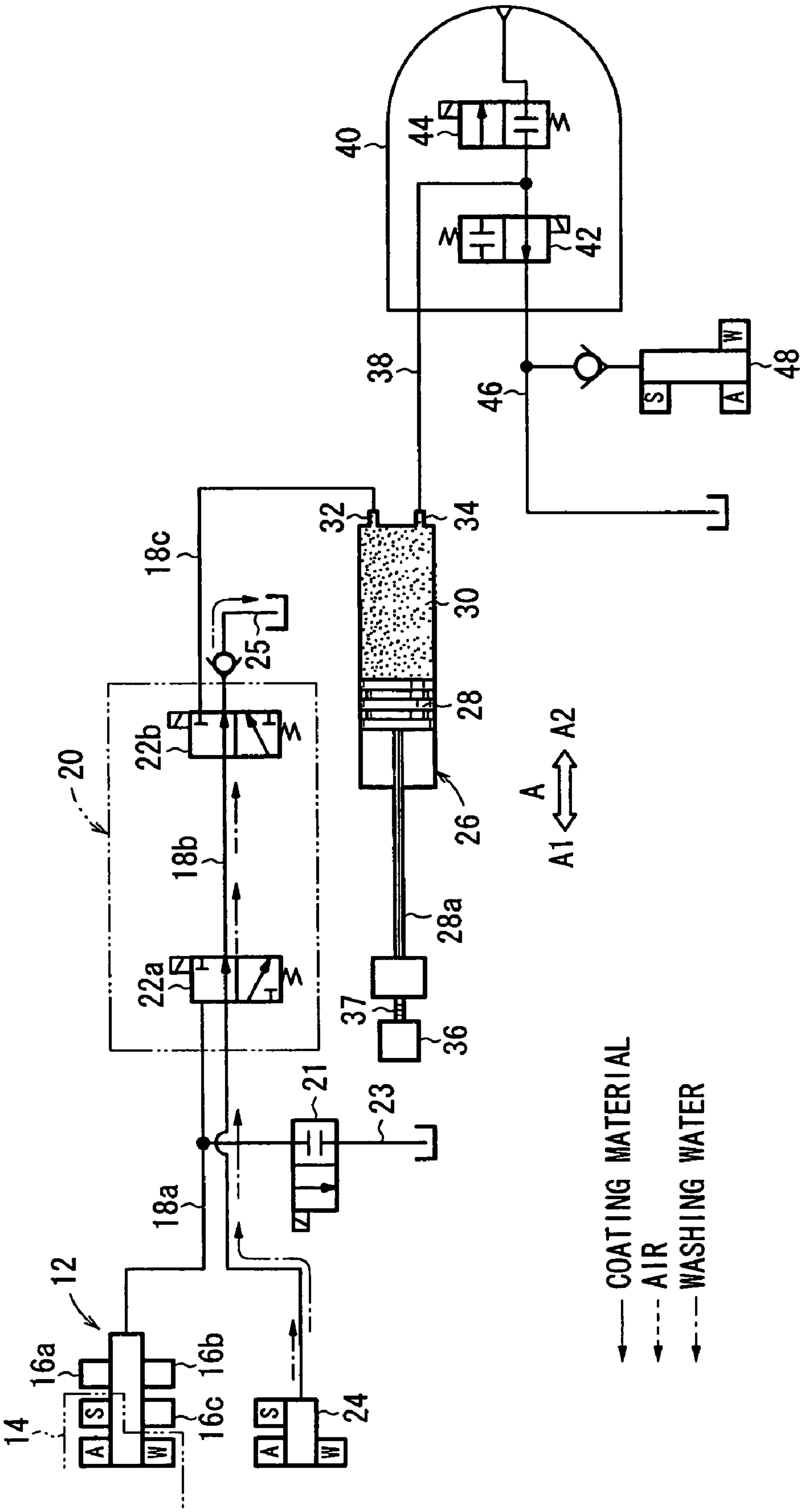
FIG. 7 is a schematic view showing the manner in which the electrostatic coating apparatus operates to wash the block valve mechanism of the electrostatic coating apparatus.

If the filling of the cylinder chamber 30 of the intermediate storage reservoir 26 with the electrically conductive coating material is finished (YES in step S6), the block valve mechanism 20 is washed (step S7). Specifically, as shown in FIG. 7, the directional control valves 22*a*, 22*b* of the block valve mechanism 20 are shifted to connect the second washing valve 24 through the electrically insulated pipe 18*b* to the second drain passage 25.

When a washing liquid (water or a thinner) is supplied from the second washing valve 24, the interior of the electrically insulated pipe 18*b* is washed, and a waste liquid is drained from the electrically insulated pipe 18*b* into the second drain passage 25. Air is then supplied from the second washing valve 24 to dry the interior of the electrically insulated pipe 18*b*, thereby electrically insulating the directional control valves 22*a*, 22*b* from each other (YES in step S8).

Figure 8:
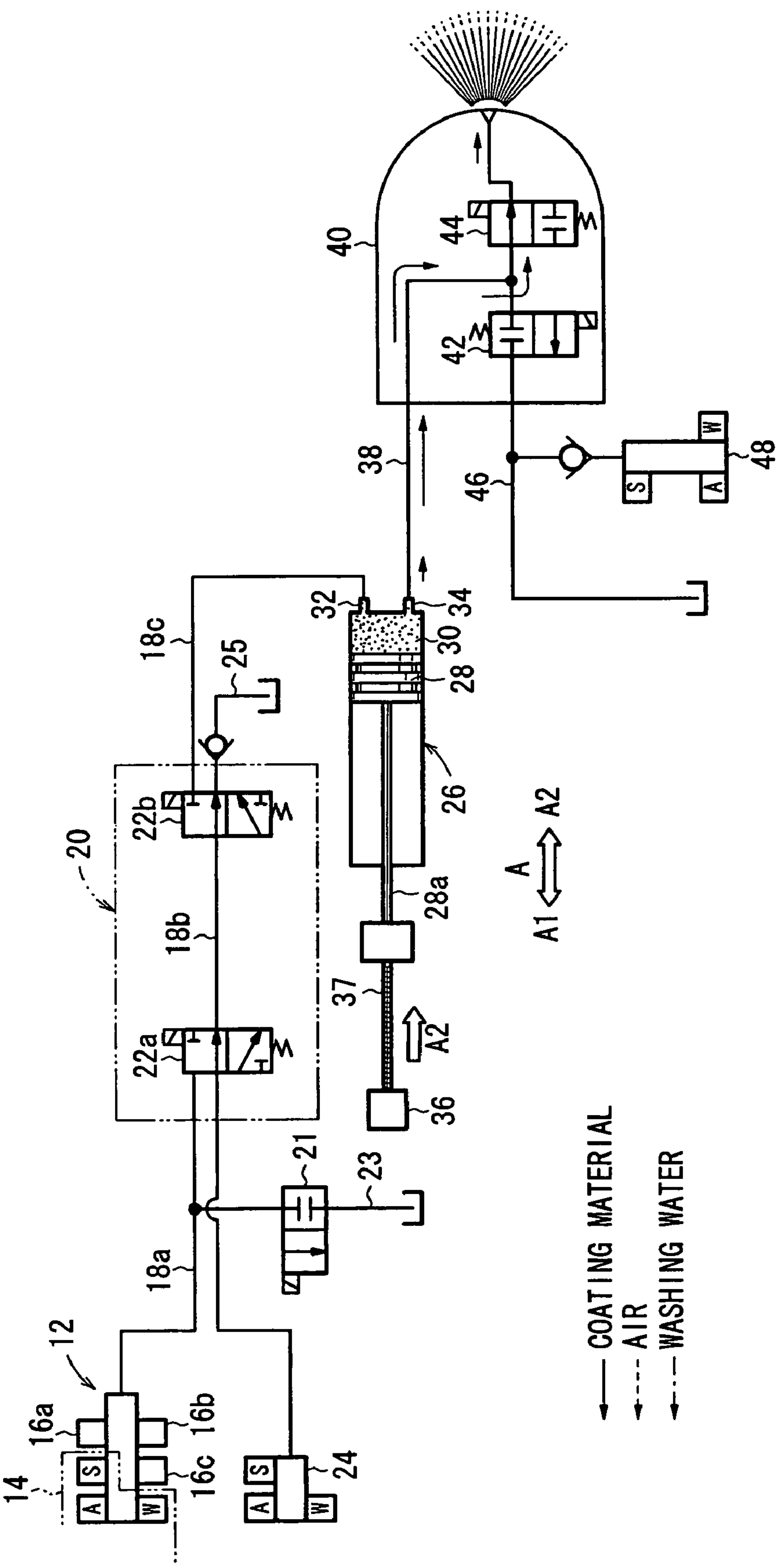
FIG. 8 is a schematic view showing the manner in which the electrostatic coating apparatus operates to perform a coating process by ejecting the electrically conductive coating material from a coating gun of the electrostatic coating apparatus.

Then, as shown in FIG. 8, the trigger valve 44 is opened, and the servomotor 36 is energized to move the piston 28 in the direction indicated by the arrow A2 to deliver the electrically conductive coating material under pressure from the cylinder chamber 30 into the delivery passage 38. The electrically conductive coating material is now ejected through the trigger valve 44 from the coating gun 40, and a high voltage is applied to the electrically conductive coating material to apply an electrostatic coating to a workpiece, not shown (step S9).

Figure 9:
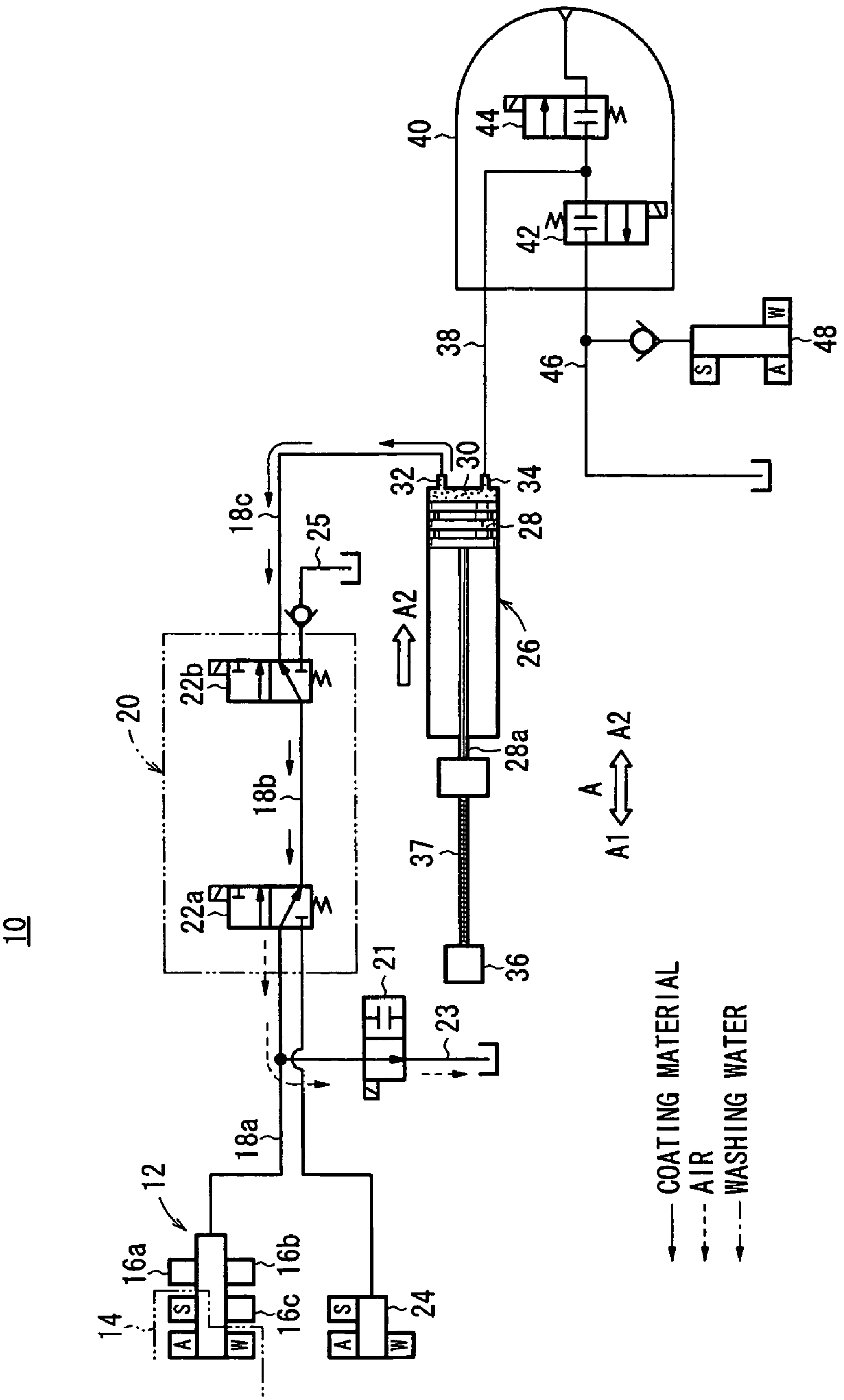
FIG. 9 is a schematic view showing the manner in which the electrostatic coating apparatus operates to return the electrically conductive coating material remaining in the intermediate storage reservoir temporarily to the block valve mechanism after the coating process is finished.

When the electrostatic coating process is finished, control goes to step S10 in which the electrically conductive coating material that remains in the intermediate storage reservoir 26 is returned temporarily to the block valve mechanism 20. Specifically, as shown in FIG. 9, the trigger valve 44 is closed. The supply passage 18*c*, the electrically insulated pipe 18*b*, and the supply passage 18*a* are connected to each other by the directional control valves 22*a*, 22*b* of the block valve mechanism 20, and the supply passage 18*a* is connected to the first drain passage 23 by the first damping valve 21.

When the servomotor 36 is energized to move the piston 28 in the direction indicated by the arrow A2, the electrically conductive coating material that remains in the cylinder chamber 30 is pushed into the supply passage 18*c* and returned temporarily to the electrically insulated pipe 18*b*. At this time, air that remains in the electrically insulated pipe 18*b* and the supply passage 18*c* is pushed into the supply passage 18*a* by the electrically conductive coating material, and drained into the first drain passage 23 connected to the supply passage 18*a*.

When the coating material valve 16*a* is opened to supply the electrically conductive coating material of the same color to the supply passage 18*a* in order to apply the electrically conductive coating material of the same color to the workpiece, no air is mixed with the electrically conductive coating material. Thus, air is effectively prevented from being introduced into the intermediate storage reservoir 26, and a failure to form a coating pattern is avoided by the simple process.

In this case, according to the present embodiment, as shown in FIG. 1, the electrically conductive coating material is supplied from the color changer valve mechanism 12 to the intermediate storage reservoir 26, and the cylinder chamber 30 of the intermediate storage reservoir 26 is filled with a predetermined amount of electrically conductive coating material.

Figure 6:
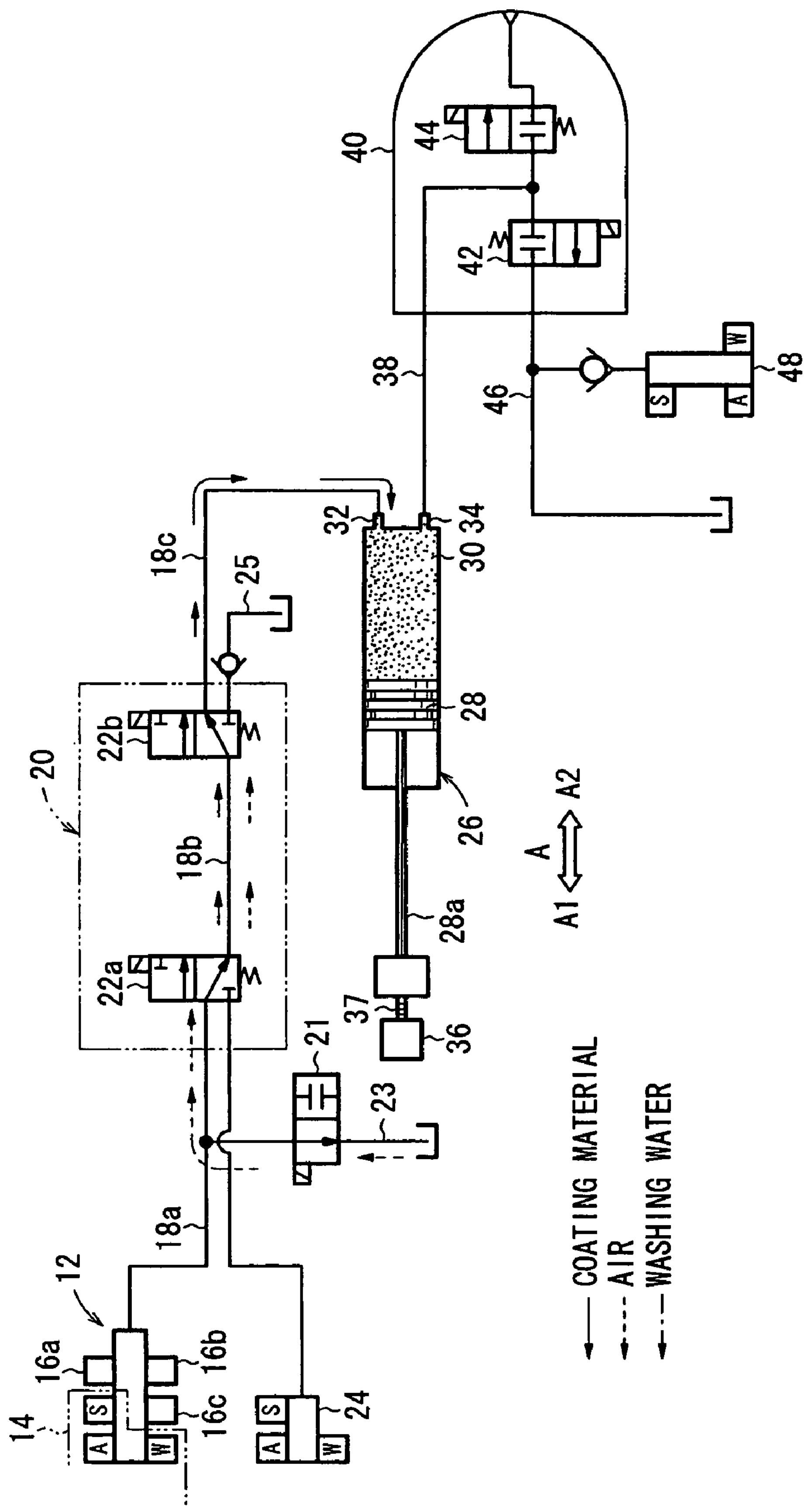
FIG. 6 is a schematic view showing the manner in which the electrostatic coating apparatus operates to deliver an electrically conductive coating material remaining in a block valve mechanism of the electrostatic coating apparatus to the intermediate storage reservoir.

Then, as shown in FIG. 6, the supplying of the electrically conductive coating material from the color changer valve mechanism 12 is stopped, and the servomotor 36 is energized to draw the electrically conductive coating material in the supply passage 18*c* into the cylinder chamber 30. Therefore, at least the electrically insulated pipe 18*b* contains air that has replaced the electrically conductive coating material. When the block valve mechanism 20 is washed, the electrically conductive coating material does not remain in the electrically insulated pipe 18*b*.

According to the present embodiment, when the block valve mechanism 20 is washed, the electrically conductive coating material which remains unused in the electrically insulated pipe 18*b* is prevented from being drained as much as possible. Consequently, an economical and efficient electrostatic coating process can easily be performed.

When the supplying of the electrically conductive coating material from the color changer valve mechanism 12 is stopped, only the servomotor 36 may be energized. Accordingly, the electrically conductive coating material is effectively prevented from being unnecessarily drained by a simple control process. In particular, when the electrostatic coating process is performed over a long period of time, a large amount of electrically conductive coating material tends to be drained from the electrically insulated pipe 18*b* each time the block valve mechanism 20 is washed. Therefore, the electrostatic coating apparatus 10 is highly improved economically.

For using a new electrically conductive coating material having a color which is different from the color of the above electrically conductive coating material, after the above coating process is finished, the application of the high voltage to the coating gun 40 is stopped, and the directional control valves 22*a*, 22*b* of the block valve mechanism 20 are shifted and the first washing valve 14 is actuated to introduce the washing liquid into the cylinder chamber 30 of the intermediate storage reservoir 26. The washing liquid washes the cylinder chamber 30 and the delivery passage 38, and is thereafter drained from the third drain passage 46 by the second damping valve 42. The electrically conductive coating material having the different color is supplied through the coating material valve 16*b*, for example, of the color changer valve mechanism 12 into the cylinder chamber 30 of the intermediate storage reservoir 26, and the coating process is performed in the same manner as described above.

When the cylinder chamber 30 of the cylinder container 26*a* is washed, the washing liquid introduced into the cylinder chamber 30 is reliably discharged from the outlet hole 34 that is positioned below the inlet hole 32. Therefore, when the electrically conductive coating material having the different color is supplied to the cylinder chamber 30, the electrically conductive coating material is not mixed with the washing liquid which would otherwise remain in the cylinder chamber 30. The process of changing electrically conductive coating material colors and washing the cylinder chamber 30 is thus efficiently and reliably performed with a simple arrangement, and the overall color changing and coating process is easily made efficient.

As shown in FIG. 1, when the electrically conductive coating material is supplied from the coating material valve 16*a* through the inlet hole 32 into the cylinder chamber 30 of the cylinder container 26*a*, if air is introduced into the cylinder chamber 30, the air tends to be trapped in an upper portion of the cylinder chamber 30.

Figure 10:
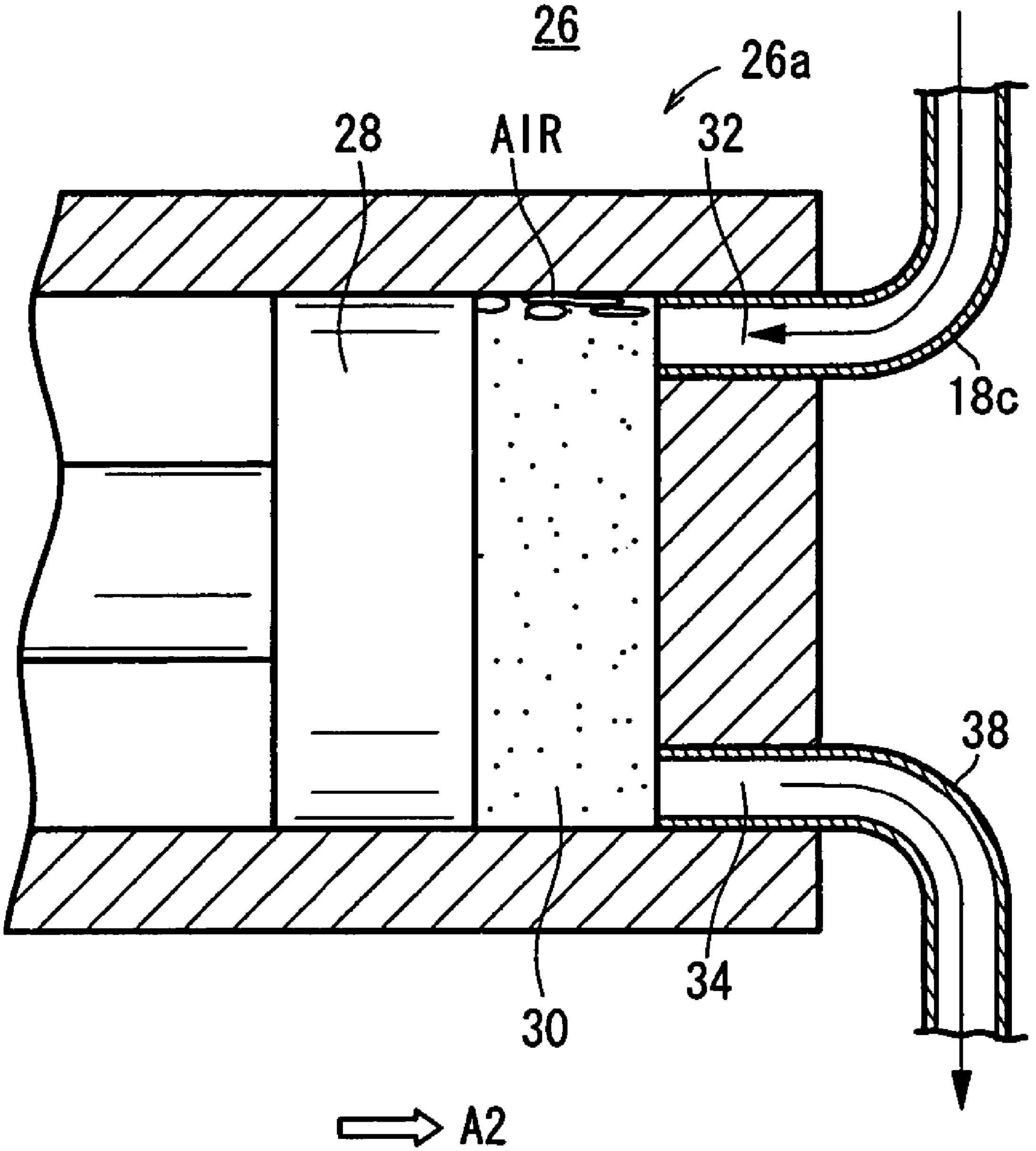
FIG. 10 is a view showing the manner in which the electrostatic coating apparatus operates when air is present in the intermediate storage reservoir.
Figure 11:
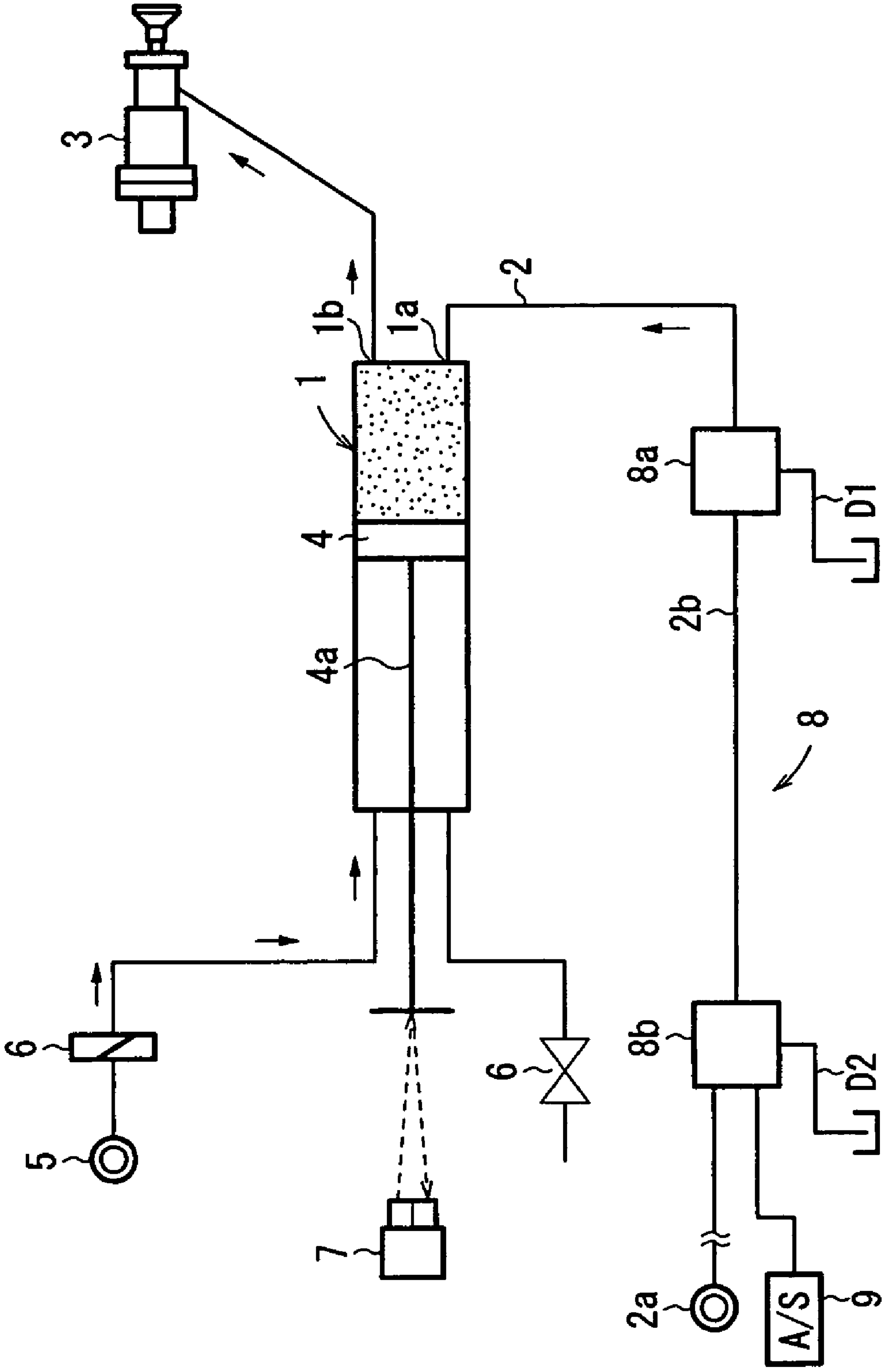
FIG. 11 is a schematic view of an electrostatic coating apparatus disclosed in Japanese Laid-Open Patent Publication No. 6-60452 and a block valve mechanism incorporated in the electrostatic coating apparatus.
Figure 12:
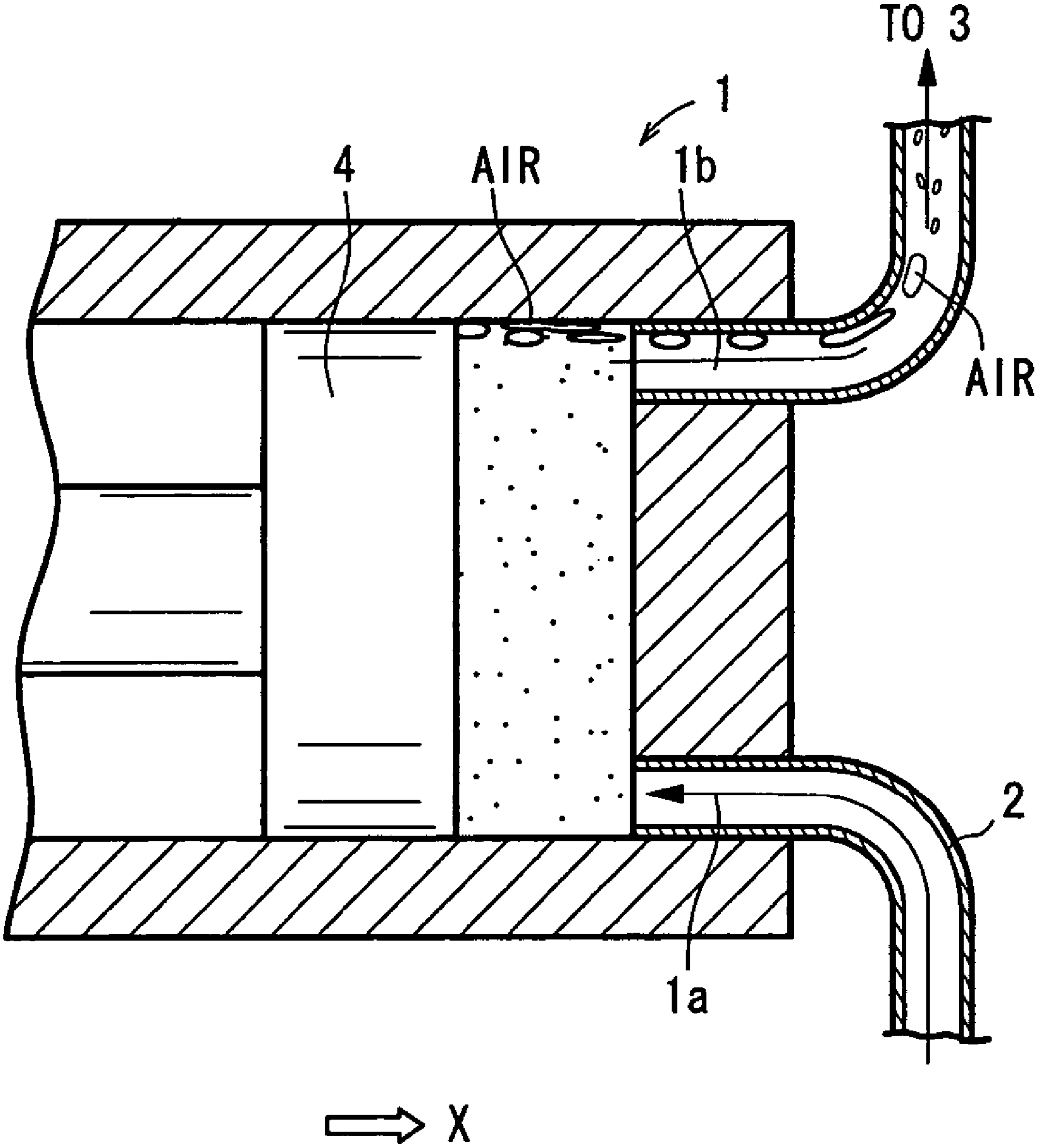
FIG. 12 is a view showing the manner in which a pump of the electrostatic coating apparatus shown in FIG. 11 operates.

According to the present embodiment, the outlet hole 34 of the cylinder container 26*a* is disposed below the inlet hole 32. Therefore, when the piston 28 is moved in the direction indicated by the arrow A2, as shown in FIG. 10, to supply the electrically conductive coating material from the cylinder chamber 30 through the outlet hole 34 to the coating gun 40, the air trapped in the cylinder chamber 30 is not introduced from the outlet hole 34 into the coating gun 40.

Accordingly, air is reliably prevented from being mixed with the coating material that is supplied from the intermediate storage reservoir 26 to the coating gun 40, with simple process and arrangement, making it possible to easily perform a high-quality electrostatic coating process.

According to the present embodiment, furthermore, as shown in FIG. 2, the intermediate storage reservoir 26 is mounted on the robot arm 60, and the inlet hole 32 is positioned upwardly of the outlet hole 34 when the robot arm 60 is in the substantially horizontal attitude. Therefore, when the robot arm 60 is kept in the substantially horizontal attitude, the outlet hole 34 of the intermediate storage reservoir 26 is positioned below the inlet hole 32 at all times. Therefore, the electrically conductive coating material mixed with air is prevented from being supplied to the coating gun 40 as much as possible.

In the present embodiment, the robot arm 60 is illustrated as the movable component of the electrostatic coating apparatus 10. However, the movable component is not limited to the robot arm, but the intermediate storage reservoir 26 may be mounted on a carriage base which is movable in the directions of three orthogonal axes, for example.

In the present embodiment, the cylinder container 26*a* of the intermediate storage reservoir 26 is disposed on the bed 64, and the block valve mechanism 20 is disposed above the cylinder container 26*a* with the insulative plate 68 interposed therebetween.

Because the insulative plate 68 is interposed between the intermediate storage reservoir 26 and the block valve mechanism 20, a sufficient surface distance is provided along the insulative plate 68 for thereby preventing a high voltage from leaking and allowing the block valve mechanism 20 to be placed as closely to the intermediate storage reservoir 26 as possible.

Therefore, the electrostatic coating apparatus 10 as a whole can easily be rendered compact, and hence can be installed compactly on the robot arm 60, for thereby making the electrostatic coating process efficient.

The cylinder container 26*a* and the rod 28*a* of the intermediate storage reservoir 26 are made of insulative resin. Consequently, the intermediate storage reservoir 26 is kept well insulative in its entirety.

The insulative cover 70 is removably fastened by screws to the bed 64 in covering relation to the cylinder container 24*a* and the block valve mechanism 20. Thus, the intermediate storage reservoir 26 has its insulation further increased. Since the insulative cover 70 is detachable from the side of the block valve mechanism 20 (i.e., upwardly), the servicing of the block valve mechanism 20, such as maintenance thereof, is effectively improved.

With the method of applying an electrostatic coating according to the present invention, when a predetermined amount of electrically conductive coating material has been supplied from the coating material supply through the supply passage to the reservoir, the supply of the electrically conductive coating material from the coating material supply is stopped, and the electrically conductive coating material that remains in at least the insulative unit is supplied to the reservoir. When the insulative unit is washed, no electrically conductive coating material remains in the insulative unit, the electrically conductive coating material which is unused is prevented from being unnecessarily drained as much as possible. Consequently, an economical and efficient electrostatic coating process can reliably be performed.

In the coating process, when the coating material in the intermediate storage mechanism is supplied from the outlet hole to the coating gun, air that is trapped in an upper portion of the intermediate storage mechanism is not introduced from the outlet hole into the coating gun. Therefore, air is reliably prevented from being mixed with the coating material that is supplied from the intermediate storage mechanism to the coating gun, with simple process and arrangement, for thereby performing an electrostatic coating process easily with high quality.

With the apparatus for applying an electrostatic coating according to the present invention, in at least the washing process or the coating process, the outlet hole of the intermediate storage mechanism is disposed below the inlet hole thereof. Consequently, in the washing process, the washing liquid that remains in a lower portion of the intermediate storage mechanism is reliably drained through the outlet port. The new coating material that is supplied to the intermediate storage mechanism is not mixed with the washing liquid, for thereby reducing the amount of discharged coating material effectively, and for thereby performing an electrostatic coating process easily with high quality.

With the apparatus for applying an electrostatic coating according to the present invention, furthermore, since the insulative plate is interposed between the intermediate storage mechanism and the insulative mechanism, a sufficient surface distance is provided along the insulative plate for thereby preventing a high voltage from leaking and allowing the insulative mechanism to be placed as closely to the intermediate storage mechanism as possible. Therefore, the apparatus for applying an electrostatic coating may be made compact as a whole and can well be installed on a robot or the like for making the electrostatic coating process efficient with ease.

The invention claimed is:

1. A method of applying an electrostatic coating with an electrostatic coating apparatus including, in a supply passage for supplying an electrically conductive coating material from a coating material supply to a coating gun, an intermediate storage reservoir and an insulative unit for electrically insulating said coating material supply and said intermediate storage reservoir from each other, comprising the steps of:

supplying said electrically conductive coating material from said coating material supply through said supply passage to said intermediate storage reservoir stopping supplying said electrically conductive coating material from said coating material supply and supplying said electrically conductive coating material which remains in at least said insulative unit to said intermediate storage reservoir and washing said insulative unit electrically insulating said coating material supply and said intermediate storage reservoir from each other, and supplying said electrically conductive coating material in said intermediate storage reservoir to said coating gun to apply an electrostatic coating.

2. A method according to claim 1, wherein when an electrically conductive coating material of the same color is to be used, said electrically conductive coating material in said intermediate storage reservoir is supplied to said coating gun to apply an electrostatic coating, and thereafter said electrically conductive coating material which remains in said intermediate storage reservoir is returned temporarily to said insulative unit.

3. A method of applying an electrostatic coating, comprising the steps of:

supplying a coating material from a coating material supply source through an inlet hole of an intermediate storage mechanism into said intermediate storage mechanism;

washing an insulative for electrically insulating said coating material supply source and said intermediate storage mechanism from each other; and applying an electrostatic coating by supplying said coating material in said intermediate storage mechanism through an outlet hole of said intermediate storage mechanism to a coating gun, while said coating material supply source and said intermediate storage mechanism are electrically insulated from each other;

wherein said inlet hole is disposed upwardly of said outlet hole at least in said washing step or said applying step.

* * * * *

UNITED STATES PATENT AND TRADEMARK OFFICE

CERTIFICATE OF CORRECTION

PATENT NO. : 7,328,862 B2
APPLICATION NO. : 10/549192
DATED : February 12, 2008
INVENTOR(S) : Masashi Takebe et al.

It is certified that error appears in the above-identified patent and that said Letters Patent is hereby corrected as shown below:

TITLE PAGE -

Item [56] References Cited, please add the following reference under

FOREIGN PATENT DOCUMENTS:

-- JP 6-57444 08/1994 --.

Signed and Sealed this

Twenty-fourth Day of June, 2008

JON W. DUDAS

*Director of the United States Patent and Trademark Office*